Oct. 30, 1928.
W. H. PHILLIPS
VINE CUTTER AND WEEDER
Filed Sept. 25, 1926
1,689,452
3 Sheets-Sheet 2
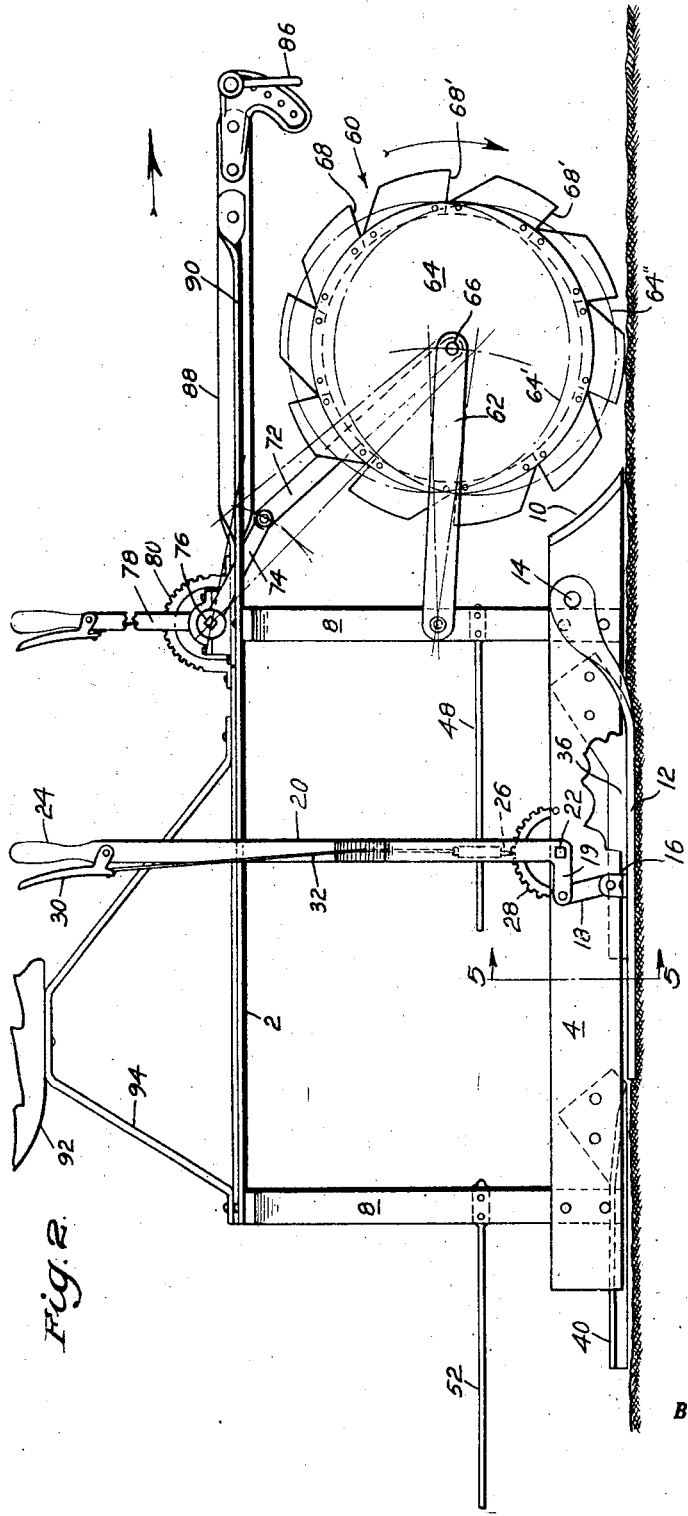
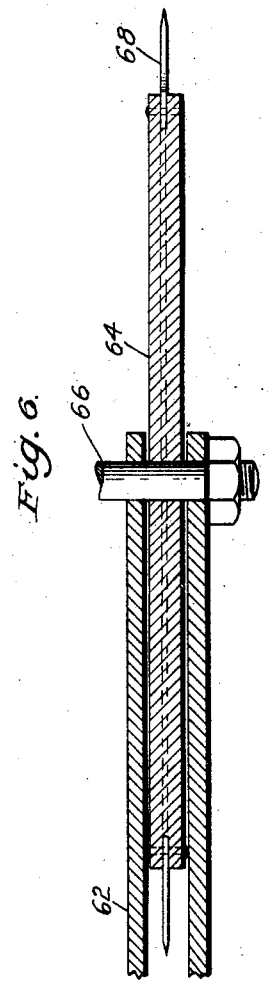
INVENTOR.
Walter H. Phillips
BY M. C. Frank
ATTORNEY.

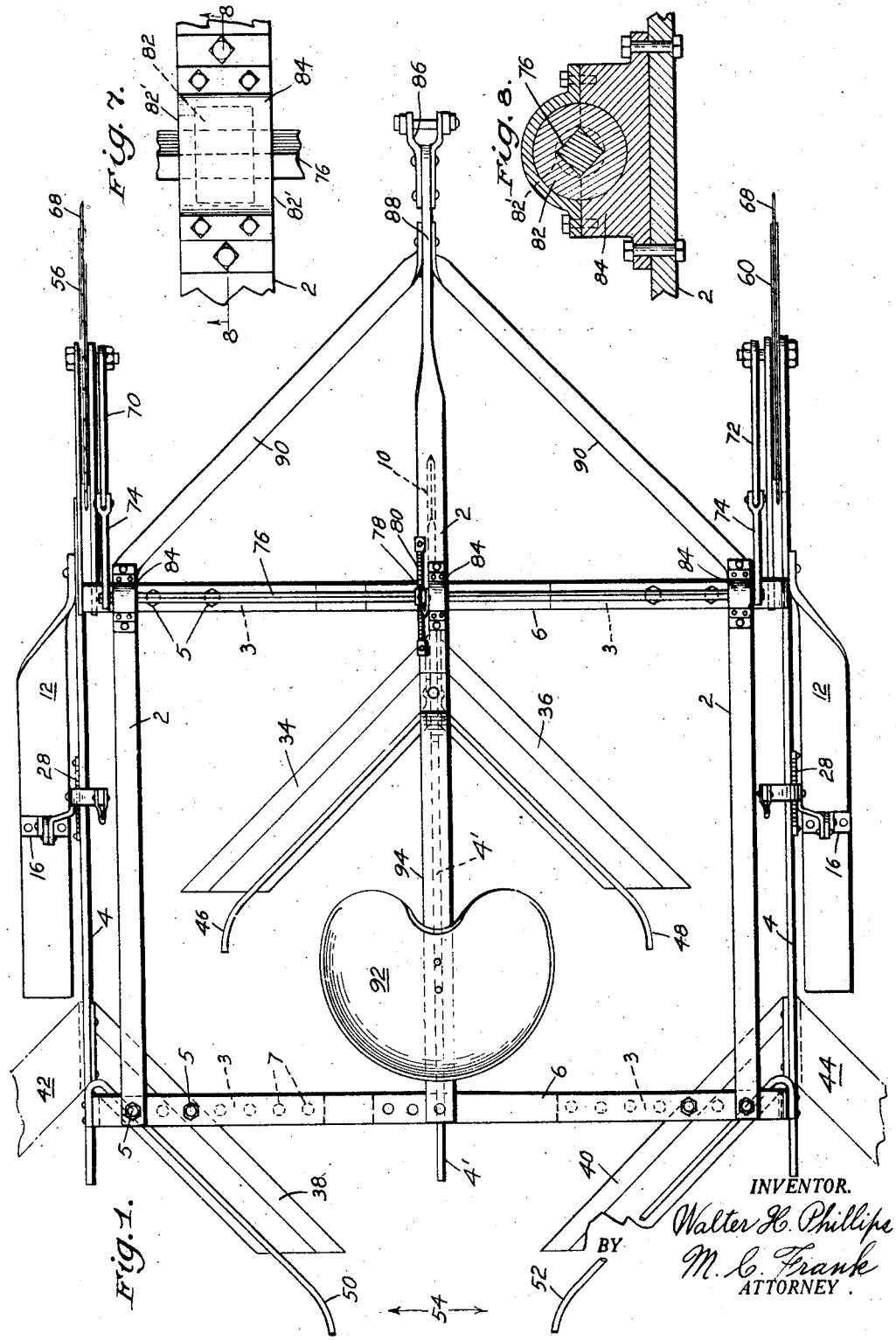

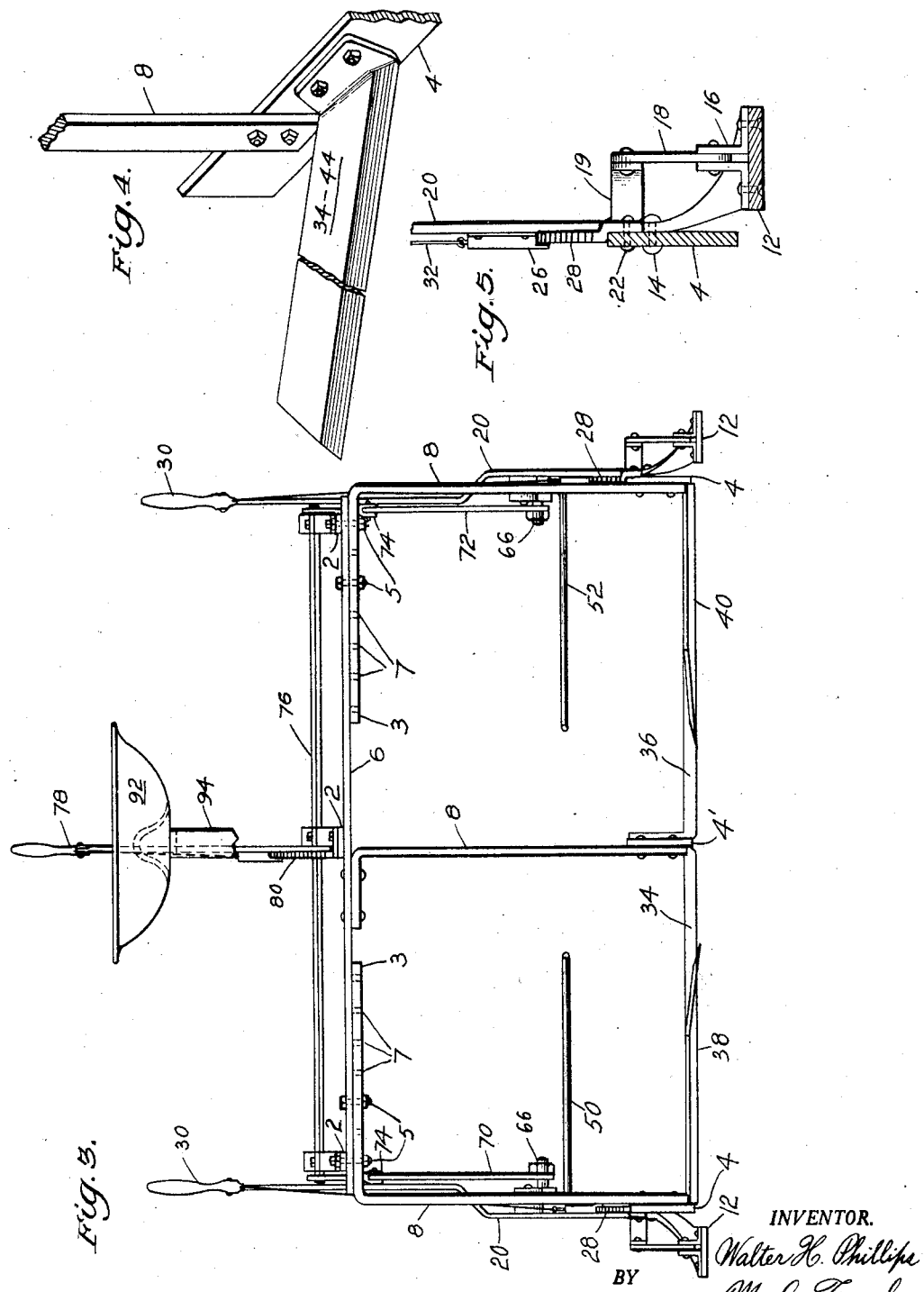

Patented Oct. 30, 1928.

1,689,452

UNITED STATES PATENT OFFICE.

WALTER H. PHILLIPS, OF MODESTO, CALIFORNIA.

VINE CUTTER AND WEEDER.

Application filed September 25, 1926. Serial No. 137,662.

This invention relates to a vine cutter and weeder intended primarily to cut and harvest vines such as bean vines, but which is found effective for the mowing of other vegetation such as weeds.

It is the object of my invention to provide an improved bean vine cutter and weeder, and one which is adapted to a wide range of vegetation.

It is a further object of my invention to provide a machine which requires a minimum amount of power for its operation.

It is further an important object of my invention to provide a machine which may be built at small expense; the short duration of the bean harvest making large capital investment in harvesting machinery uneconomical.

It is an object of my invention to provide an improved means for segregating tangled vines into lanes.

It is an object of my invention to provide the frame of my improved machine with laterally adjustable sides to vary the spread of the machine and consequently the width of the lane cut.

It is an object of my invention to provide an adjustable machine with an uniquely rigid manner of mounting the adjustable cutters; and it is a further object to provide an adjustment for determining cutter elevation, which is best suited to compensate for the type and positioning of irregularities most often found in a cultivated ground surface.

Further objects of my invention are to provide an improved arrangement of blades, and of guide rods, and to combine the two into an improved means for stacking the harvest into windrows.

Other objects of my invention, such as those relating to simplicity of construction and operation, and effectiveness of result produced will become apparent as the description proceeds or will be suggested by the particular use to which my device is put.

Referring to the drawings:

Figure 1 is a plan of my improved machine.

Fig. 2 is a side elevation of the device, with a portion of the framing broken away to disclose a horizontal mowing knife.

Fig. 3 is an end elevation of the device as viewed from the rear.

Fig. 4 is an enlarged perspective detail of a horizontal mowing knife and support; the knife being foreshortened to reduce the spread of the drawing.

Fig. 5 is an enlarged detail vertical section through a sled-runner. The plane of section is indicated by the line 5—5 in Fig. 2.

Fig. 6 is a diametrical section of one of the rotary cutters.

Fig. 7 is an enlarged plan of one of the square-shaft bearings incorporated in the cutter adjusting gear.

Fig. 8 is a median transverse vertical section of the same; the plane of section being indicated by the line 8—8 in Fig. 7.

The machine frame is fabricated of a plurality of longitudinal beams, 2, 4, transverse beams 6, and vertical posts 8.

The vertical posts 8 of the frame have their upper ends turned inwardly, Fig. 3, to form support arms 3, for the transverse beams 6, and to which arms the beams are connected by bolts 5 that may engage selective holes of a series of spaced holes 7, for lateral adjustment of the outer frame beams 4 carrying the hereinafter described horizontal mowing knives.

The three lower longitudinal beams 4, are positioned with their thin sections vertical, and are curved at their front ends to resemble sled runners, the front curve 10 of which may be sharpened to a knife edge to assist in the cutting of the standing vegetation. For convenience, the central one of the three beams 4 will be differentiated by the reference character 4'.

Means other than the lower longitudinal beams 4, are provided for normally serving as running gear to guide the machine along the ground. Runners 12 are pivoted each at their front upturned ends to each of the two outside beams 4 by pins 14, and means are provided for supporting the machine framework at an adjustable elevation upon these two runners. A yoke 16 is attached to the upper face of each runner near its center and pivotally connects it to a short link 18 which in turn is pivoted to the short arm 19 of the L-lever 20. This L-lever is pivoted by a pin 22 at the juncture of its long and short arms, to the beam 4. The long arm of this lever 20 is provided with a handle 24, and carries a dog 26 cooperating with the notched sector 28 on the beam 4. The dog is normally spring-pressed into a notch in the sector and holds the lever 20 and therefore the runner 12 immovable. When it is desired to raise or lower the frame relative to the runners, one or both of the levers 20 will be moved, after withdrawing the dogs 26. Conventional release-latch handles 30 and connections 32, are provided for withdrawing the dogs.

The horizontal mowing knives 34 to 44, are fixed to the lower longitudinal beams 4 as shown in Fig. 4, at an angle of about forty-five degrees, and are tilted slightly downward toward their cutting edge. The two forward blades 34 and 36 are fixed to the center beam 4' of the lower frame, and extend outwardly and rearwardly; while the two main rear blades 38 and 40 are fixed to the inside of the outer frame beams 4, and extend inwardly and rearwardly. The blades 42 and 44, indicated by the dash lines in Fig. 1, are auxiliary blades which may be attached to the machine to increase its radius of operation. Usually they will be used when cutting weeds or low vines. It is contemplated that the horizontal blades will operate with their cutting edges about three-quarters of an inch below the ground surface, but the adjustable runners allow considerable leeway and permit the knives to be lowered further or raised with respect to the ground surface. It is of course, not new to mount mowing knives adjustably in such machine frames to permit their use on uneven ground, but I have not seen any prior use of my expedient of merely altering the height of the running gear relative to the entire machine frame. This permits the knives to be most rigidly supported; and provides an adjustability best suited to compensate for irregularities and ruts, in the positions between the rows of vines, where such irregularities are most apt to be found.

Means are provided for stacking the cut vines into windrows. Rods 46, 48, 50 and 52, substantially parallel to each of the horizontal blades, extend from the vertical frame members 8, and are supported above and slightly behind the respective blades 34, 36, 38 and 40. It will be noted from Fig. 1, that the front rods 46 and 48, cooperating with the front blades 34 and 36, completely clear the center portion of the machine track by forcing the vines from this center portion back into the vines being cut at the outside portions of the track. The entire harvest is then bunched by the rear rods 50 and 52 into a windrow which passes without interference out through the space 54 provided between the extending ends of the rods 50 and 52. The windrow is thus allowed to deposit itself along the cleaned central portion of the machine track. It will be noticed that no portion of the framing interferes with the collection and passage of the windrow; due both to the frame construction and peculiar blade arrangement. It is therefore unnecessary to either elevate or rake the harvest to form windrows.

Improved means are provided for segregating the crop into lanes the width of the horizontal-blade tracks. This expedient is especially necessary in handling tangled vines.

Two vertical rotary cutters 56 and 60, of substantial height are provided, one at each side of the machine, ahead of the horizontal blades. These cutters are circular, and are journaled for rotation in the forks 62 which are pivoted to the uprights 8 at the front of the machine. The cutters are thereby suspended in position to roll along the ground in front of the machine. These cutters consist of disks 64 supported on bolts 66. Each cutter is circumferentially slotted to receive the cutter blades 68, (see Fig. 6). These blades are separately pinned or otherwise secured into place, and have their advancing edges (in the normal direction of rotation) undercut to provide the hook-like projections shown at 68' in Fig. 2. As these cutters roll along the ground they cut downwardly through the tangled vines, and positively cut apart any tangles which are so stubborn as to be dragged down to the ground before yielding and are further cut by the shearing action against the curved cutting edge 10. Since the disk cutters actually roll along the ground their power consumption is negligible.

It will be noted that each outer vertical frame member 8 is preceded by a vertical cutter. This arrangement economizes the tractive effort which would be required to pull apart the tangled vines, by substituting the cutting action of the blades 68 for the tearing action of the said vertical frame members.

Means are provided for adjustably raising or lowering the vertical cutters 56 and 60. Links 70 and 72, pivoted at their lower ends to the cutter supporting bolt 66, are pivotally connected at their upper ends to the cranks 74 carried on a square shaft 76. The square shaft is mounted to permit its rotation by the hand lever 78, having a dog operating on the notched sector 80 similar to the aforementioned adjustable levers 20. Cylindrical bearing disks 82 have a square hole formed axially through them to receive the shaft 76 and are pressed, keyed, clamped or otherwise fixed on said shaft to form journals. Bearings 84, (see Figs. 7 and 8), are bolted to the upper frame members 2 to receive the said journals, and each bearing is provided with side walls 82' to prevent axial drifting of the shaft. In Fig. 2, the vertical cutters are illustrated in slightly raised position. The dashed circles 64' and 64", illustrate the position assumed by the circumference of the disk 64 in the other adjusted positions. In normal position the lower portion of the cutter circumference is slightly underground.

The machine may be pulled by horses, or a motor tractor. A hook 86 provides for connection of traction means to the machine, and is connected to the frame by a longitudinal beam 88 and reenforcing yoke members 90. In this case the beam 88 is integral with one of the beams 2. A seat 92 is positioned between the two hand levers 20, and is supported on the central beam 2 by the bracket 94.

My invention is broader than any single narrow embodiment thereof. In its interpretation, therefore, I desire to be limited only by a reasonable interpretation of the claims.

I claim:

1. A vine cutter and weeder comprising a plurality of cutting knives, a frame supporting said cutting knives in mowing position, supporting means for guiding said frame along the ground, said supporting means comprising pivoted runners, means for adjustably raising and lowering said runners relative to said frame, and auxiliary means for adjustably raising or lowering any one of said cutting knives relative to the frame.

2. A vine cutter and weeder comprising a plurality of horizontal blades, a frame supporting said blades, supporting means for guiding said frame along the ground, means for adjustably raising and lowering said supporting means relative to the frame, whereby to position said horizontal blades selectively at above or below the ground level, a plurality of vertical rotary cutters, having serrated cutting edges, means suspending said vertical cutters for free rotation from the front portion of said frame, and adjusting means for raising or lowering said vertical cutters independently of said frame to permit the cutters to roll with their bottoms slightly under the surface of uneven ground.

3. In a vine cutter and weeder having a frame and running gear adapting it to be moved over the ground, a front pair of horizontal cutting knives supported near the ground level and each extending outward and rearward from the central portion of the machine, and a rear pair of horizontal cutting blades supported near the ground level and each extending inward and rearward from the outer sides of the machine, and a guide rod above and substantially parallel to each blade for urging the cut vines into windrows.

4. A machine of the class described comprising a plurality of substantially horizontal mowing blades arranged in sets of opposite disposition, a frame supporting said blades, supporting means for guiding said frame along the ground and comprising parallelly disposed runners having pivotal connection with the frame, means for adjustably raising and lowering the runners relative to the frame to compensate for irregularities in the ground, a plurality of vertically disposed disc cutters arranged forwardly of the frame and having linked connection therewith, and means associated with said cutters for adjusting their cutting depth relative to the ground.

5. A machine of the class described comprising a frame, a plurality of horizontally disposed sets of mowing blades arranged in said frame, said sets having their respective blades arranged in opposition to each other, supporting means for guiding said frame along the ground and comprising parallelly disposed runners mounted on opposite sides of the frame and having pivotal connection therewith, levers mounted on the frame and having linked connection with said runners and adapted to adjust the same relative to the frame, a plurality of vertically disposed rotary cutters arranged forwardly of the frame and having linked connection therewith, and lever means carried by the frame and co-acting with said cutters to normally hold the same in cutting relation to the ground but adjustable relative thereto.

6. In a machine of the class described, a frame comprising longitudinal side members and a centrally disposed member, a set of mowing blades carried by said central member and a set of blades carried by said side members and arranged in opposition to said first mentioned set, runners disposed along the outer sides of the side members and having their ends pivotally connected thereto and adapted to support the weight of the frame, lever means associated with the frame and adapted to normally hold said runners in rigid relation with the frame, but to provide for adjustment of said runners relative thereto, and guide rods positioned in said frame above the blades for urging the cut vines into windrows.

7. In a machine of the class described, a frame comprising longitudinal side members and an intermediate member arranged in parallelism therewith, a set of horizontally disposed mowing blades carried by said intermediate member and projecting outwardly therefrom and a set of like blades mounted on the side members and projecting inwardly toward said intermediate member, and guide rods carried by the intermediate member and said side members and disposed in parallel relation to each blade to augment the cutting of the vines and acting to finally urge the cut vines into windrows.

8. In a machine of the class described, a frame comprising equally spaced side members and an intermediate member, a plurality of horizontally disposed mowing blades carried by said frame and having their cutting edges tilted slightly toward the ground, a plurality of vertically disposed rotary cutters having cutting blades and arranged forwardly of the frame and having linked connection therewith, and lever and link means carried by the forward end of the frame and adapted to normally hold said cutters in position to enter the ground slightly but provided for adjustment relative thereto when desired.

In testimony whereof, I affix my signature.

WALTER H. PHILLIPS.